(12) United States Patent
Aitken et al.

(10) Patent No.: US 10,173,921 B2
(45) Date of Patent: Jan. 8, 2019

(54) LITHIUM ORTHOPHOSPHATE GLASSES, CORRESPONDING GLASS-CERAMICS AND LITHIUM ION-CONDUCTING NZP GLASS CERAMICS

(71) Applicant: CORNING INCORPORATED, Corning, NY (US)

(72) Inventors: Bruce Gardiner Aitken, Corning, NY (US); Nadja Teresia Lonnroth, Corning, NY (US)

(73) Assignee: Corning Incorporated, Corning, NY (US)

(*) Notice: Subject to any disclaimer, the term of this patent is extended or adjusted under 35 U.S.C. 154(b) by 521 days.

(21) Appl. No.: 14/469,803

(22) Filed: Aug. 27, 2014

(65) Prior Publication Data
US 2015/0064576 A1 Mar. 5, 2015

Related U.S. Application Data

(60) Provisional application No. 61/870,995, filed on Aug. 28, 2013.

(51) Int. Cl.
*C03C 3/21* (2006.01)
*C03B 32/02* (2006.01)
(Continued)

(52) U.S. Cl.
CPC ............... *C03C 3/21* (2013.01); *C03B 32/02* (2013.01); *C03C 3/062* (2013.01); *C03C 3/064* (2013.01); *C03C 3/066* (2013.01); *C03C 3/068* (2013.01); *C03C 3/127* (2013.01); *C03C 3/16* (2013.01); *C03C 3/17* (2013.01); *C03C 3/19* (2013.01); *C03C 3/253* (2013.01); *C03C 4/18* (2013.01);
(Continued)

(58) Field of Classification Search
CPC .............. C03C 10/00; C03C 10/00009; C03C 10/0018; C03C 10/0027; C03C 4/18; C03B 32/02
See application file for complete search history.

(56) References Cited

U.S. PATENT DOCUMENTS 4,784,976 A 11/1988 Aitken
5,702,995 A 12/1997 Fu
(Continued)

FOREIGN PATENT DOCUMENTS

CN 101388261 3/2009
CN 101811828 8/2010
(Continued)

OTHER PUBLICATIONS

Abstract of JP2008-47412.
(Continued)

*Primary Examiner* — Eli S Mekhlin
(74) *Attorney, Agent, or Firm* — Shantanu Pathak (57) ABSTRACT

A lithium-ion conductive glass-ceramic article has a crystalline component characterized by the formula $MA_2(XO_4)_3$, where M represents one or more monovalent or divalent cations selected from Li, Na and Zn, A represents one or more trivalent, tetravalent or pentavalent cations selected from Al, Cr, Fe, Ga, Si, Ti, Ge, V and Nb, and X represents P cations which may be partially substituted by B cations.

21 Claims, 7 Drawing Sheets

(51) Int. Cl.

| | | |
|---|---|---|
| *C03C 3/062* | (2006.01) | |
| *C03C 3/064* | (2006.01) | |
| *C03C 3/253* | (2006.01) | |
| *H01M 10/0562* | (2010.01) | |
| *C03C 3/066* | (2006.01) | |
| *C03C 3/068* | (2006.01) | |
| *C03C 3/12* | (2006.01) | |
| *C03C 3/16* | (2006.01) | |
| *C03C 3/17* | (2006.01) | |
| *C03C 3/19* | (2006.01) | |
| *C03C 4/18* | (2006.01) | |
| *C03C 10/00* | (2006.01) | |
| *H01M 8/1016* | (2016.01) | |
| *H01M 10/0525* | (2010.01) | |

(52) U.S. Cl.
CPC ......... *C03C 10/00* (2013.01); *H01M 10/0562* (2013.01); *H01M 8/1016* (2013.01); *H01M 10/0525* (2013.01); *H01M 2300/0071* (2013.01)

(56) References Cited

U.S. PATENT DOCUMENTS

| | | | |
|---|---|---|---|
| 6,845,622 B2 | 1/2005 | Sauciuc et al. | |
| 7,211,532 B2 | 5/2007 | Fu | |
| 7,771,880 B2 | 8/2010 | Kumar et al. | |
| 7,998,622 B2 | 8/2011 | Inda | |
| 2007/0048617 A1 | 3/2007 | Inda | |
| 2007/0048619 A1* | 3/2007 | Inda | H01M 4/131 429/322 |
| 2009/0239152 A1* | 9/2009 | Katoh | H01M 4/40 429/319 |
| 2009/0239153 A1 | 9/2009 | Inda | |
| 2009/0317724 A1 | 12/2009 | Kumar et al. | |
| 2010/0028782 A1 | 2/2010 | Inda | |
| 2013/0136981 A1* | 5/2013 | Peuchert | C03C 12/00 429/188 |
| 2014/0057162 A1* | 2/2014 | Schneider | C03C 4/18 429/188 |

FOREIGN PATENT DOCUMENTS

| | | | | |
|---|---|---|---|---|
| DE | 102011013018 | | 3/2011 | |
| JP | 2008-47412 | | 2/2008 | |
| WO | WO2011/124347 | * | 10/2011 | ............ H01M 2/16 |
| WO | WO2012/119820 | * | 11/2012 | ............ H01M 4/58 |

OTHER PUBLICATIONS

PCT/US2014/052828.
Machine Translation of CN 101388261.
Machine Translation of CN 101811828.
Adachi et al; "Fast Li Conducting Ceramic Electrolytes"; Advanced Materials, 1996, 8, No. 2, pp. 127-135.
Anantharamulu et al; "A Wide-Ranging Review on Nasicon Type Materials"; J Mater Sci (2011) 46:2821-2837.
Fu; "Fast $Li^+$ Ion Conduction in $Li_2O$—($Al_2O_3$ $Ga_2O_3$)—$TiO_2$—$P_2O_5$ Glass-Ceramics" J Mater Sci 33 (1998) 1549-1553.
Kun et al; "Influence of $AL_2O_3$ Additions on Crystallization Mechanism and Conductivity of $LI_2O$—$GE_{2O}$—$P_2O_5$ Glass-Ceramics"; Physica b 406 (2011) 3947-3950.
Narvaez-Semanate et al; "Microstructure and Ionic Conductivity of $LI_{1+x}AL_xTI_{2-x}(PO_4)_3$ Nasicon Glass-Ceramics" Solid State Ionics 181 (2010) 1197-1204.
Thokchom et al; "Supertonic Conductivity in a Lithium Aluminum Germanium Phosphate Glass-Ceramic" Journal of the Electrochemical Society; 155 (12) A915-A920 (2008).
Thokchom et al; "Water Durable Lithium Ion Conducting Composite Membranes From the $Li_2O$—$Al_2O_3$—$TiO_2$—$P_2O_5$ Glass-Ceramic"; Journal of the Electrochemical Society; 154 (4) a331-a336 (2007).
Xu et al; "High Lithium Conductivity in $Li_{1.3}Cr_{0.3}Ge_{1.7}(PO_4)_3$ Glass-Ceramics" Materials Letters 58 (2004) 3428-3431.
Xu et al; "Lithium Ion-Conducting Glass-Ceramics of $Li_{1.5}Al_{0.5}Ge_{1.5}(PO_4)_3$-$xLi_2O$ (x=0.0-0.20) With Good Electrical and Electrochemical Properties"; J. Am. Ceram. Soc. 90 [9] 2802-2806.
Xu et al; "Preparation and Characterization of Lithium Ion-Conducting Glass-Ceramics in the $Li_{1+x}Cr_xGe_{2-x}(PO_4)_3$ System" Electrochemistry Communication 6 (2004) 1233-1237.

* cited by examiner

LITHIUM ORTHOPHOSPHATE GLASSES, CORRESPONDING GLASS-CERAMICS AND LITHIUM ION-CONDUCTING NZP GLASS CERAMICS

CROSS-REFERENCE TO RELATED APPLICATIONS

This application claims the benefit of priority under 35 U.S.C. § 119 of U.S. Provisional Application Ser. No. 61/870,995 filed on Aug. 28, 2013, the entire content of which is hereby incorporated by reference.

BACKGROUND

Field

The present disclosure relates generally to lithium ion-conductive materials and more specifically to a glass-ceramic process for forming dense, lithium ion-conducting membranes.

Technical Background

Solid electrolytes, also known as fast ion conductors, can be used in energy storage devices such as solid oxide fuel cells and lithium-ion batteries. The solid electrolyte permits movement of ions without the need for a liquid or soft membrane separating the electrodes. In a lithium-ion battery, for example, lithium ions move from a negative electrode to a positive electrode during discharge (and back when charging) via the solid electrolyte. The solid electrolyte can conduct lithium ions through vacancies in the electrolyte crystal lattice. The solid electrolyte can also provide a hermetic barrier between the anode and the cathode in order to prevent the anode and cathode from sharing a common electrolyte solution.

Important to the development of Li-ion batteries is the availability of dense, solid, ion-conductive electrolyte membranes. A challenge in the formation of such membranes via traditional ceramic routes is the inability to sinter suitable starting materials to sufficient density to form a membrane that is hermetic while providing the requisite conductivity and economy.

In view of the foregoing, it would be desirable to develop an economical process for forming solid, lithium ion-conductive membranes.

BRIEF SUMMARY

In accordance with embodiments of the present disclosure, lithium ion-conductive, lithium titanium metal phosphate glass-ceramic membranes having an NZP crystal phase as the predominate crystal phase are formed by quenching and heat treating a molten glass having the corresponding composition.

A glass can be formed, for example, by roller quenching a glass from the melt. The molten glass and the resulting glass article can have a composition comprising, in mole percent, 5-28% $Li_2O$, 14-37% $TiO_2$ and 32-48% $P_2O_5$. The composition further comprises one or more of $Al_2O_3$, $Cr_2O_3$, $Fe_2O_3$, $Ga_2O_3$, $SiO_2$, $GeO_2$, $V_2O_5$, $Nb_2O_0$, $Na_2O$, ZnO and $B_2O_3$.

In embodiments, the glass composition satisfies at least one relationship (i)-(iii), where (i) the composition comprises at least two oxides selected from the group consisting of >0-13% $Al_2O_3$, >0-13% $Fe_2O_3$ and >0-13% $Nb_2O_5$; (ii) the composition comprises at least two oxides selected from the group consisting of >0-10% $Cr_2O_3$, >0-5% $SiO_2$ and >0-25% $GeO_2$; and (iii) the composition comprises at least three oxides selected from the group consisting of >0-13% $Al_2O_3$, >0-13% $Fe_2O_3$, >0-13% $Nb_2O_5$, >0-10% $Cr_2O_3$, >0-5% $SiO_2$ and >0-25% $GeO_2$.

A glass-ceramic article may be formed by heat treating the glass. The glass-ceramic article has a majority crystalline component characterized by the formula $M_yA_2(XO_4)_3$ (0.1≤y≤2.2), where M represents one or more monovalent or divalent cations selected from the group consisting of Li, Na and Zn, A represents one or more trivalent, tetravalent or pentavalent cations selected from the group consisting of Al, Cr, Fe, Ga, Si, Ti, Ge, V and Nb, and X represents P cations which may be partially substituted by B cations. The glass-ceramic may be further characterized by at least one relationship (i)-(iii), where (i) A represents two or more cations selected from the group consisting of Al, Fe and Nb; (ii) A represents two or more cations selected from the group consisting of Cr, Si and Ge; and (iii) A represents three or more cations selected from the group consisting of Al, Fe, Nb, Cr, Si and Ge. Glass-ceramics containing the aforementioned NZP phase may be characterized by a high lithium ion conductivity.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in greater detail to various embodiments of the subject matter of the present disclosure, some embodiments of which are illustrated in the accompanying drawings. The same reference numerals will be used throughout the drawings to refer to the same or similar parts.

Disclosed are precursor glasses and NASICON-type (i.e., NZP-type) materials that are formed via a glass-ceramic route. According to various embodiments, vitreous domains in $Li_2O$—$TiO_2$—$P_2O_5$ are disclosed, further comprising one or more of $Al_2O_3$, $Cr_2O_3$, $Fe_2O_3$, $Ga_2O_3$, $SiO_2$, $GeO_2$, $V_2O_5$, $Nb_2O_5$, $Na_2O$, $ZnO$ and $B_2O_3$.

The glasses are obtained by melting of a mixture of $Li_2CO_3(s)$ and/or $LiH_2PO_4(s)$, $TiO_2(s)$, $H_3PO_4(aq)$ and an oxide, carbonate or phosphate of one or more additional metal(s). The dry batch ingredients can be turbula milled, for example, prior to the addition of aqueous phosphoric acid to form a slurry. The slurry is calcined.

The calcination time and temperature may range from 1-12 h and 300-500° C., respectively. An example calcination time is 6 h and an example calcination temperature is 400° C. Following calcination, the batch is placed in a melting furnace. Calcined batches are melted at 1400-1600° C. (e.g., 1500° C.) and then roller quenched to form thin sheets. Molten material can be quenched from the melt temperature to less than 600° C. at a quench rate of from 40° C./min to 200° C./min (e.g., 80 or 100° C./min). The molten material can be roller quenched on a stainless steel substrate.

The glass sheets may have areal dimensions of several square centimeters, though the process may be scaled to larger area sheets. The melt can be quenched and rolled into sheets having a maximum thickness of 2 mm. In embodiments, the thickness of the glass sheets was about 0.5 to 1 mm.

The roller-quenched glass is then heat treated to nucleate and grow the crystalline phase. The heat treatment can be performed under ambient conditions. A heating rate to a nucleation temperature can range from 1° C./min to 20° C./min, e.g., 1, 2, 5, 10 or 20° C./min. A heating rate to a crystal growth temperature can range from 1° C./min to 20° C./min, e.g., 1, 2, 5, 10 or 20° C./min. Depending on the composition of the batch, the nucleation temperature can range from 500° C. to 700° C. and the crystal growth temperature can range from 800° C. to 900° C. A nucleation time and a crystal growth time can range from 0 to 2 h and 0.25 h to 72 h, respectively.

When the glass is subjected to a heat treatment above its crystallization temperature ($T_x$), the dominant phase of the resultant glass-ceramic has the rhombohedral NZP structure. In embodiments, the crystal growth temperature is at least 50° C. greater, e.g., at least 100° C., 200° C., 300° C. or 350° C. greater than the crystallization temperature ($T_x$) of the composition.

In the NASICON framework, represented by the formula $M(1)M(2)A_2(XO_4)_3$, the crystal structure comprises a three-dimensional network of $XO_4$ tetrahedra sharing corners with $AO_6$ octahedra. The M(1) sites are surrounded by six oxygen atoms and located at an inversion center. The M(2) sites are symmetrically-distributed around a three-fold axis with ten-fold oxygen coordination.

Without wishing to be bound by theory, the M(1) and M(2) sites are principally occupied by one or more alkali metal ions such as Li or Na, though the alkali metal ions may be substituted partly by Zn or a vacancy. The symbol A represents two or more (e.g., three or more) multivalent metal ions, e.g., Al, Cr, Fe, Ga, Si, Ti, Ge, V and Nb, and the symbol X is principally phosphorus (P) though the phosphorus may be substituted partially by B.

The resulting glass-ceramic membrane can have an average thickness of less than 2 mm, e.g., from 0.5 to 1 mm. In embodiments, the glass-ceramic can have an average thickness of less than 200 microns, where the constituent crystalline material can have an average grain size of less than 10 um, e.g., less than 1 um. Self-supporting glass-ceramic membranes as thin as 100 microns can be formed.

The glass-ceramic article may contain less than 5 vol. % retained glassy phase. In embodiments, the glass-ceramic article is entirely crystalline or contains at most 1 vol. % or 2 vol. % retained glass. In further embodiments, the glass-ceramic includes a NZP-type crystal as the majority crystalline phase. By majority crystalline phase, it is meant that the glass-ceramic can include at least 70 vol. % (e.g., at least 70, 75, 80, 85, 90 or 95 vol. %) NZP phase. The glass-ceramic may contain an NZP-type crystalline phase as the sole crystal phase.

The composition of the batch of raw materials can correspond directly to the stoichiometry of the crystal phase that is desired. Thus the disclosed glass compositions and the disclosed glass-ceramic compositions may each include, in mol. %: 5-28% $Li_2O$, 14-37% $TiO_2$, and 32-48% $P_2O_5$ with one or more of the following: 0-13% $Al_2O_3$, 0-10% $Cr_2O_3$, 0-13% $Fe_2O_3$, 0-10% $Ga_2O_3$, 0-5% $SiO_2$, 0-25% $GeO_2$, 0-7% $V_2O_5$, 0-13% $Nb_2O_5$, 0-17% $Na_2O$, 0-17% $ZnO$ and 0-6% $B_2O_3$.

The glass compositions, in example embodiments, comprise 5-28% $Li_2O$, 14-37% $TiO_2$, and 32-48% $P_2O_5$, and further comprising at least one relationship (i)-(iii), wherein (i) the composition comprises at least two oxides selected from the group consisting of >0-13% $Al_2O_3$, >0-13% $Fe_2O_3$ and >0-13% $Nb_2O_5$, (ii) the composition comprises at least two oxides selected from the group consisting of >0-10% $Cr_2O_3$, >0-5% $SiO_2$ and >0-25% $GeO_2$; and (iii) the composition comprises at least three oxides selected from the group consisting of >0-13% $Al_2O_3$, >0-13% $Fe_2O_3$; >0-13% $Nb_2O_5$, >0-10% $Cr_2O_3$, >0-5% $SiO_2$ and >0-25% $GeO_2$.

The composition of the glass may correspond stoichiometrically to the NZP crystal phase. In related embodiments, the composition of the glass may be non-stoichiometric with respect to the NZP crystal phase. For example, the glass composition may be up to 10 mol. % deficient or may contain up to 10 mol. % excess of one or more constituents. A glass may be prepared, for instance, with 5% or even 10% excess phosphorus.

The resulting glass-ceramic has a crystalline component characterized by the formula $M_yA_2(XO_4)_3$ (0.1≤y≤2.2), where M represents one or more monovalent or divalent cations selected from the group consisting of Li, Na and Zn, A represents two or more trivalent, tetravalent or pentavalent cations selected from the group consisting of Al, Cr, Fe, Ga, Si, Ti, Ge, V and Nb, and X represents P cations which may be partially substituted by B cations, and further comprising at least one relationship (i)-(iii), where (i) A represents two or more cations selected from the group consisting of Al, Fe and Nb; (ii) A represents two or more cations selected from the group consisting of Cr, Si and Ge; and (iii) A represents three or more cations selected from the group consisting of Al, Fe, Nb, Cr, Si and Ge. In example glass-ceramic compositions, M is Li and the subscript y can range from 1.2 to 2.2.

In embodiments, A may represent two or more trivalent, tetravalent or pentavalent cations selected from the group consisting of Al, Cr, Fe, Ga, Si, Ti, Ge, V and Nb. In further embodiments, A may represent three or more trivalent, tetravalent or pentavalent cations selected from the group consisting of Al, Cr, Fe, Ga, Si, Ti, Ge, V and Nb. In still further embodiments, A may represent four or more trivalent, tetravalent or pentavalent cations selected from the group consisting of Al, Cr, Fe, Ga, Si, Ti, Ge, V and Nb.

It will be appreciated that in the idealized stoichiometry, $M_y A_2 (XO_4)_3$ ($0.1 \leq y \leq 2.2$), the elemental constituents may be located on alternate sites to those described above. For example, in a $Li_{1.3}Nb_{0.45}Al_{0.45}Ti_{1.1}(PO_4)_{2.85}(BO_4)_{0.15}$ glass ceramic, the aluminum (Al) may be located on an X site or on an interstitial site within the crystalline matrix.

Example glass stoichiometries are summarized in Table 1, where the constituent compositions are given in molar %.

The $Li_2O$ content (in mol. %) of the disclosed glass and glass-ceramic compositions can range from 5-28%. For example, the compositions may include from 10-22% or from 12-20% $Li_2O$, e.g., 10, 12, 14, 16, 18, 20 or 22% $Li_2O$. The amount of $TiO_2$ (in mol. %) of the disclosed glass and glass-ceramic compositions can range from 14-37%. In embodiments, the composition include at least 18 mol. % $TiO_2$. For example, the compositions may include from 18-36% or from 20-30% $TiO_2$, e.g., 20, 22, 24, 26, 28 or 30% $TiO_2$. The amount of $P_2O_5$ (in mol. %) of the disclosed glass and glass-ceramic compositions can range from 32-48%. For example, the compositions may include from 36-46% or from 38-42% $P_2O_5$, e.g., 36, 38, 40, 42, 44 or 46% $P_2O_5$.

The disclosed glass and glass-ceramic compositions may optionally include $Al_2O_3$ or $Fe_2O_3$. The $Al_2O_3$ or $Fe_2O_3$ content (in mol. %) can independently range from 0-13%. For example, the compositions may include from 4-10% or from 6-8% $Al_2O_3$, e.g., 4, 6 or 8% $Al_2O_3$. The compositions may include from 2-12%, 2-6% or from 4-10% $Fe_2O_3$, e.g., 2, 4, 6, 8 or 10% $Fe_2O_3$.

The disclosed glass and glass-ceramic compositions may optionally include $Cr_2O_3$ or $Ga_2O_3$. The $Cr_2O_3$ or $Ga_2O_3$ content (in mol. %) can independently range from 0-10%. For example, the $Cr_2O_3$ may range from 1-8% or from 4-6%, e.g., 1, 2, 4, 6, or 8% $Cr_2O_3$. The $Ga_2O_3$ content may range from 4-8% or from 6-8%, for example.

The disclosed compositions may optionally include from 0-5 mol. % $SiO_2$, e.g., from 2-4 mol. % $SiO_2$.

The disclosed compositions may optionally include from 0-25 mol. % $GeO_2$. For example, the compositions may include from 4-20%, 6-10% or from 10-15% $GeO_2$, e.g., 4, 6, 8, 10, 12, 14 or 16% $GeO_2$.

The disclosed compositions may optionally include from 0-7 mol. % $V_2O_5$, e.g., from 2-6% or from 4-6% $V_2O_5$.

The disclosed compositions may optionally include from 0-13 mol. % $Nb_2O_5$. For example, the compositions may include from 4-10% or from 4-8% $Nb_2O_5$, e.g., 4, 6, 8 or 10% $Nb_2O_5$.

The disclosed compositions may optionally include $Na_2O$ or ZnO. The $Na_2O$ or ZnO content (in mol. %) can independently range from 0-17%. The compositions may include, for example, 4-10% or 6-8% ZnO, e.g., 4, 6, 8 or 10% ZnO.

The disclosed compositions may optionally include from 0-6 mol. % $B_2O_3$, e.g., 1-6% or 1-4% $B_2O_3$.

TABLE 1

Stoichiometry and composition of example lithium ion-conducting materials.

| Stoichiometry | $Li_2O$ | $TiO_2$ | $P_2O_5$ | ZnO | $Al_2O_3$ | $Cr_2O_3$ | $Fe_2O_3$ | $SiO_2$ | $GeO_2$ | $V_2O_5$ | $Nb_2O_5$ | $B_2O_3$ |
|---|---|---|---|---|---|---|---|---|---|---|---|---|
| $Zn_{0.25}Li_{0.5}Fe_{0.7}Nb_{0.7}Ti_{0.6}(PO_4)_3$ | 7.58 | 18.18 | 45.45 | 7.58 | — | — | 10.61 | — | — | — | 10.61 | — |
| $LiFe_{0.7}Nb_{0.7}Ti_{0.6}(PO_4)_3$ | 15.15 | 18.18 | 45.45 | — | — | — | 10.61 | — | — | — | 10.61 | — |
| $Zn_{0.15}LiFe_{0.3}Nb_{0.3}Al_{0.3}Ti_{1.1}(PO_4)_3$ | 13.51 | 29.73 | 40.54 | 4.05 | 4.05 | — | 4.05 | — | — | — | 4.05 | — |
| $Zn_{0.25}Li_{0.8}Fe_{0.3}Nb_{0.3}Al_{0.3}Ti_{1.1}(PO_4)_3$ | 10.81 | 29.73 | 40.54 | 6.76 | 4.05 | — | 4.05 | — | — | — | 4.05 | — |
| $Li_{1.3}Nb_{0.3}Al_{0.6}Ti_{1.1}(PO_4)_3$ | 17.57 | 29.73 | 40.54 | — | 8.11 | — | — | — | — | — | 4.05 | — |
| $Zn_{0.15}LiNb_{0.3}Al_{0.6}Ti_{1.1}(PO_4)_3$ | 13.51 | 29.73 | 40.54 | 4.05 | 8.11 | — | — | — | — | — | 4.05 | — |
| $Zn_{0.25}Li_{0.8}Nb_{0.3}Al_{0.6}Ti_{1.1}(PO_4)_3$ | 10.81 | 29.73 | 40.54 | 6.76 | 8.11 | — | — | — | — | — | 4.05 | — |
| $Zn_{0.4}LiAl_{0.8}Ti_{1.2}(PO_4)_3$ | 12.82 | 28.21 | 38.46 | 10.26 | 10.26 | — | — | — | — | — | — | — |
| $Zn_{0.3}LiCr_{0.3}Al_{0.3}Ti_{1.4}(PO_4)_3$ | 13.51 | 29.73 | 40.54 | 8.11 | 4.05 | 4.05 | — | — | — | — | — | — |
| $Li_{1.6}Ga_{0.6}Ti_{1.4}(PO_4)_3$ | 20.00 | 35.00 | 37.50 | — | — | — | — | — | — | — | — | — |
| $Zn_{0.3}Li_{1.3}Fe_{0.3}Al_{0.6}Ti_{1.1}(PO_4)_3$ | 16.25 | 27.50 | 37.50 | 7.50 | 7.50 | — | 3.75 | — | — | — | — | — |
| $Li_{1.3}Cr_{0.3}Nb_{0.3}Al_{0.3}Ti_{1.1}(PO_4)_3$ | 17.57 | 29.73 | 40.54 | — | 4.05 | 4.05 | — | — | — | — | 4.05 | — |
| $LiNb_{0.45}Al_{0.45}Ti_{1.1}(PO_4)_3$ | 14.08 | 30.99 | 42.25 | — | 6.34 | — | — | — | — | — | 6.34 | — |
| $Li_{0.95}Nb_{0.4}Al_{0.35}Ti_{1.25}(PO_4)_3$ | 13.19 | 34.72 | 41.67 | — | 4.86 | — | — | — | — | — | 5.56 | — |
| $LiNb_{0.6}Al_{0.6}Ti_{0.8}(PO_4)_3$ | 14.71 | 23.53 | 44.12 | — | 8.82 | — | — | — | — | — | 8.82 | — |
| $Li_{1.6}Fe_{0.3}Nb_{0.3}Al_{0.6}Ti_{0.8}(PO_4)_3$ | 21.62 | 21.62 | 40.54 | — | 8.11 | — | 4.05 | — | — | — | 4.05 | — |
| $Li_{1.3}V_{0.3}Al_{0.3}Ti_{1.1}(PO_4)_3$ | 17.57 | 29.73 | 40.54 | — | 8.11 | — | — | — | — | 4.05 | — | — |
| $Li_{0.7}V_{0.3}Nb_{0.3}Al_{0.3}Ti_{1.1}(PO_4)_3$ | 10.29 | 32.35 | 44.12 | — | 4.41 | — | — | — | — | 4.41 | 4.41 | — |
| $Li_{1.3}Nb_{0.45}Al_{0.45}Ti_{1.1}(PO_4)_{2.85}(BO_4)_{0.15}$ (example 1) | 17.57 | 29.73 | 38.51 | — | 6.08 | — | — | — | — | — | 6.08 | 2.03 |
| $Li_{1.6}Nb_{0.45}Al_{0.45}Ti_{1.1}(PO_4)_{2.7}(BO_4)_{0.3}$ | 20.78 | 28.57 | 35.06 | — | 5.84 | — | — | — | — | — | 5.84 | 3.90 |
| $Li_{1.3}Cr_{0.3}Ge_{0.6}Ti_{1.1}(PO_4)_3$ (example 2) | 16.25 | 27.50 | 37.50 | — | — | 3.75 | — | — | 15.00 | — | — | — |
| $Li_{1.3}Cr_{0.3}Ge_{0.9}Ti_{0.8}(PO_4)_3$ | 16.25 | 20.00 | 37.50 | — | — | 3.75 | — | — | 22.50 | — | — | — |
| $Li_{1.4}Fe_{0.3}Nb_{0.3}Al_{0.4}Ti_{1.0}(PO_4)_3$ | 18.92 | 27.03 | 40.54 | — | 5.41 | — | 4.05 | — | — | — | 4.05 | — |
| $Li_{1.4}Fe_{0.4}Nb_{0.4}Al_{0.4}Ti_{0.8}(PO_4)_3$ | 19.44 | 22.22 | 41.67 | — | 5.56 | — | 5.56 | — | — | — | 5.56 | — |
| $Li_{1.6}Cr_{0.6}Ge_{0.6}Ti_{0.8}(PO_4)_3$ (example 3) | 20.00 | 20.00 | 37.50 | — | — | 7.50 | — | — | 15.00 | — | — | — |
| $Li_{1.6}Cr_{0.3}Ge_{0.6}Ti_{1.1}(PO_4)_{2.85}(BO_4)_{0.15}$ (example 4) | 19.28 | 26.51 | 34.34 | — | — | 3.61 | — | — | 14.46 | — | — | 1.81 |
| $Li_{1.4}Cr_{0.4}Ge_{0.4}Ti_{1.2}(PO_4)_3$ | 17.50 | 30.00 | 37.50 | — | — | 5.00 | — | — | 10.00 | — | — | — |
| $Li_{1.6}Cr_{0.3}Al_{0.3}Ge_{0.3}Ti_{1.1}(PO_4)_3$ | 20.00 | 27.50 | 37.50 | — | 3.75 | 3.75 | — | — | 7.50 | — | — | — |
| $LiNb_{0.45}Al_{0.45}Ge_{0.2}Ti_{0.9}(PO_4)_3$ | 14.08 | 25.35 | 42.25 | — | 6.34 | — | — | — | 5.63 | — | 6.34 | — |
| $Li_{1.9}Cr_{0.6}Ge_{0.6}Ti_{0.8}(PO_4)_{2.85}(BO_4)_{0.15}$ | 22.89 | 19.28 | 34.34 | — | — | 7.23 | — | — | 14.46 | — | — | 1.81 |
| $Li_{1.6}Cr_{0.6}Si_{0.1}Ti_{1.3}(PO_4)_3$ | 20.00 | 32.50 | 37.50 | — | — | 7.50 | — | 2.50 | — | — | — | — |
| $Li_{1.9}Cr_{0.6}Si_{0.1}Ti_{1.3}(PO_4)_{2.85}(BO_4)_{0.15}$ | 22.89 | 31.33 | 34.34 | — | — | 7.23 | — | 2.41 | — | — | — | 1.81 |
| $Li_{1.9}Cr_{0.3}Al_{0.3}Ge_{0.3}Ti_{1.1}(PO_4)_{2.85}(BO_4)_{0.15}$ | 22.89 | 26.51 | 34.34 | — | 3.61 | 3.61 | — | — | 7.23 | — | — | 1.81 |

TABLE 1-continued

Stoichiometry and composition of example lithium ion-conducting materials.

| Stoichiometry | $Li_2O$ | $TiO_2$ | $P_2O_5$ | ZnO | $Al_2O_3$ | $Cr_2O_3$ | $Fe_2O_3$ | $SiO_2$ | $GeO_2$ | $V_2O_5$ | $Nb_2O_5$ | $B_2O_3$ |
|---|---|---|---|---|---|---|---|---|---|---|---|---|
| $Li_{1.8}Cr_{0.4}Al_{0.4}Ge_{0.3}Ti_{0.9}(PO_4)_3$ | 22.50 | 22.50 | 37.50 | — | 5.00 | 5.00 | — | — | 7.50 | — | — | — |
| $Li_{2.1}Cr_{0.4}Al_{0.4}Ge_{0.3}Ti_{0.9}(PO_4)_{2.85}(BO_4)_{0.15}$ | 25.30 | 21.69 | 34.34 | — | 4.82 | 4.82 | — | — | 7.23 | — | — | 1.81 |
| $Li_{1.6}Cr_{0.6}Ge_{0.3}Ti_{1.1}(PO_4)_3$ | 20.00 | 27.50 | 37.50 | — | — | 7.50 | — | — | 7.50 | — | — | — |
| $Li_{1.9}Cr_{0.6}Ge_{0.3}Ti_{1.1}(PO_4)_{2.85}(BO_4)_{0.15}$ | 22.89 | 26.51 | 34.34 | — | — | 7.23 | — | — | 7.23 | — | — | 1.81 |
| $Li_{1.3}Nb_{0.45}Al_{0.45}Ti_{0.9}(PO_4)_{2.85}(BO_4)_{0.15}$ | 17.57 | 24.32 | 38.51 | — | 6.08 | — | — | — | 5.41 | — | 6.08 | 2.03 |
| $LiNb_{0.3}Al_{0.3}Ge_{0.2}Ti_{1.2}(PO_4)_3$ | 13.51 | 32.43 | 40.54 | — | 4.05 | — | — | — | 5.41 | — | 4.05 | — |
| $Li_{1.3}Fe_{0.3}Nb_{0.3}Al_{0.3}Ti_{1.1}(PO_4)_{2.85}(BO_4)_{0.15}$ | 17.57 | 29.73 | 38.51 | — | 4.05 | — | 4.05 | — | — | — | 4.05 | 2.03 |
| $Li_{1.6}Cr_{0.3}Si_{0.6}Ti_{1.1}(PO_4)_{2.85}(BO_4)_{0.15}$ | 19.28 | 26.51 | 34.34 | — | — | 3.61 | — | 14.46 | — | — | — | 1.81 |
| $Li_{1.1}Cr_{0.1}Ge_{0.8}Ti_{1.1}(PO_4)_3$ | 13.75 | 27.50 | 37.50 | — | — | 1.25 | — | — | 20.00 | — | — | — |
| $Li_{1.2}Cr_{0.2}Ge_{0.7}Ti_{1.1}(PO_4)_3$ | 15.00 | 27.50 | 37.50 | — | — | 2.50 | — | — | 17.50 | — | — | — |
| $Li_{1.4}Cr_{0.4}Ge_{0.5}Ti_{1.1}(PO_4)_3$ | 17.50 | 27.50 | 37.50 | — | — | 5.00 | — | — | 12.50 | — | — | — |
| $Li_{1.5}Cr_{0.5}Ge_{0.4}Ti_{1.1}(PO_4)_3$ | 18.75 | 27.50 | 37.50 | — | — | 6.25 | — | — | 10.00 | — | — | — |
| $Li_{1.7}Cr_{0.7}Ge_{0.2}Ti_{1.1}(PO_4)_3$ | 21.25 | 27.50 | 37.50 | — | — | 8.75 | — | — | 5.00 | — | — | — |
| $Li_{1.7}Cr_{0.7}Ge_{0.7}Ti_{0.6}(PO_4)_3$ | 21.25 | 15.00 | 37.50 | — | — | 8.75 | — | — | 17.50 | — | — | — |
| $Li_{1.45}Cr_{0.45}Ge_{0.45}Ti_{1.1}(PO_4)_3$ (example 5) | 18.13 | 27.50 | 37.50 | — | — | 5.63 | — | — | 11.25 | — | — | — |
| $Li_{1.3}Cr_{0.3}Ge_{0.5}Ti_{1.2}(PO_4)_3$ | 16.25 | 30.00 | 37.50 | — | — | 3.75 | — | — | 12.50 | — | — | — |
| $Li_{1.6}Cr_{0.6}Ge_{0.4}Ti_{1.0}(PO_4)_3$ | 20.00 | 25.00 | 37.50 | — | — | 7.50 | — | — | 10.00 | — | — | — |
| $Li_{1.7}Cr_{0.7}Ge_{0.4}Ti_{0.9}(PO_4)_3$ | 21.25 | 22.50 | 37.50 | — | — | 8.75 | — | — | 10.00 | — | — | — |
| $Li_{1.8}Cr_{0.8}Ge_{0.4}Ti_{0.8}(PO_4)_3$ | 22.50 | 20.00 | 37.50 | — | — | 10.00 | — | — | 10.00 | — | — | — |
| $Li_{1.5}Cr_{0.5}Ge_{0.3}Ti_{1.2}(PO_4)_3$ | 18.75 | 30.00 | 37.50 | — | — | 6.25 | — | — | 7.50 | — | — | — |
| $Li_{1.5}Cr_{0.5}Ge_{0.5}Ti_{1.0}(PO_4)_3$ | 18.75 | 25.00 | 37.50 | — | — | 6.25 | — | — | 12.50 | — | — | — |
| $Li_{1.5}Cr_{0.5}Ge_{0.7}Ti_{0.8}(PO_4)_3$ | 18.75 | 20.00 | 37.50 | — | — | 6.25 | — | — | 17.50 | — | — | — |
| $Li_{1.5}Cr_{0.5}Ge_{0.8}Ti_{0.7}(PO_4)_3$ | 18.75 | 17.50 | 37.50 | — | — | 6.25 | — | — | 20.00 | — | — | — |
| $Li_{1.55}Cr_{0.55}Ge_{0.35}Ti_{1.1}(PO_4)_3$ | 19.38 | 27.50 | 37.50 | — | — | 6.88 | — | — | 8.75 | — | — | — |

Figure 1:
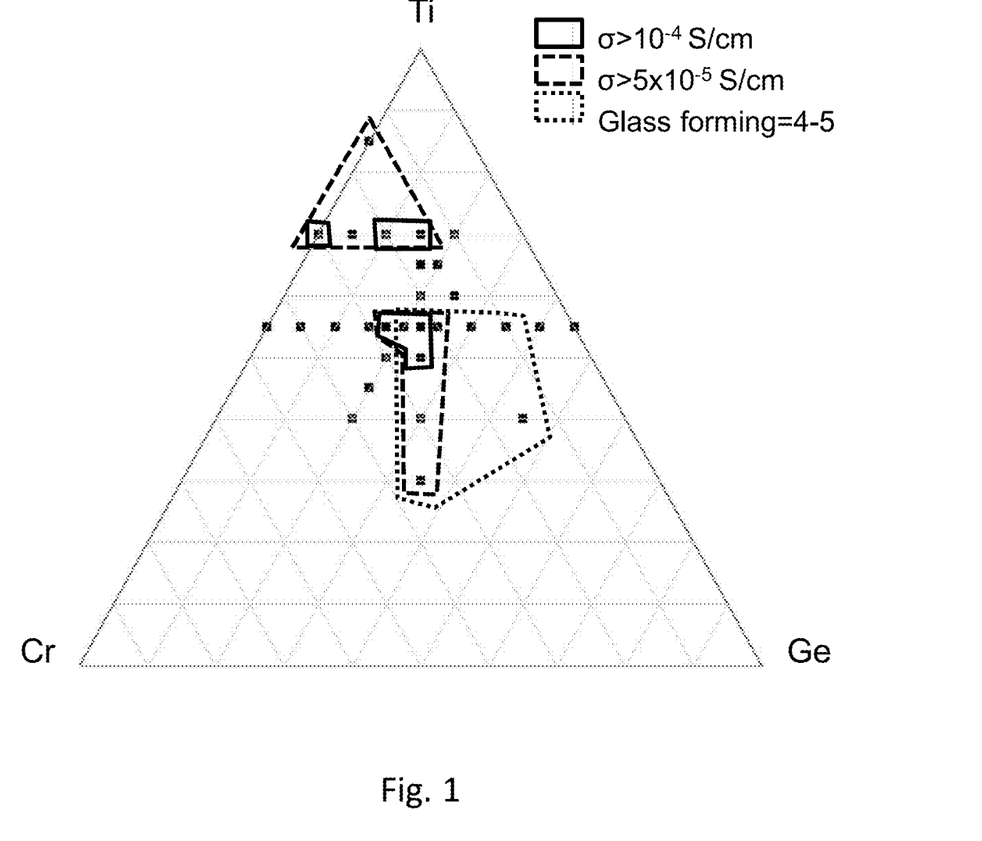
FIG. 1 is a compositional landscape for Ti, Cr and Ge-containing materials showing glass forming regions and ionic conductivities.

Compositions within the system Cr—Ge—Ti, for example, i.e., lithium-chromium-germanium-titanium phosphates, display good glass formability (i.e., a glass formability index in the range of 4-5) within the region 1-10 mol % $Cr_2O_3$, 5-25 mol % $GeO_2$, and 15-30 mol % $TiO_2$ (see FIG. 1). Conductivities of at least $10^{-4}$ S/cm are observed for compositions within the region 5-7 mol % $Cr_2O_3$, 8.5-20 mol % $GeO_2$ and 17-28 mol % $TiO_2$.

A method of making a glass-ceramic article comprises forming a glass melt including, in mole percent, 5-28% $Li_2O$, 14-37% $TiO_2$, 32-48% $P_2O_5$, 0-13 $Al_2O_3$, 0-10 $Cr_2O_3$, 0-13 $Fe_2O_3$, 0-10 $Ga_2O_3$, 0-5% $SiO_2$, 0-25 $GeO_2$, 0-7 $V_2O_5$, 0-13 $Nb_2O_5$, 0-17 $Na_2O$, 0-17 ZnO and 0-6 $B_2O_3$, quenching the melt to form a glass article, and heat treating the glass article to form a glass-ceramic article having an NZP phase as a majority crystalline phase.

As compared with traditional ceramic routes, i.e., powder sintering, the glass-ceramic materials made by the instant approach are fully dense. Further, the glasses can be made directly to the desired shape by casting and then then, via heat treatment, crystallized into a dense NZP glass-ceramic. Some NZP glass-ceramics are characterized by high ionic conductivity. The disclosed glass-ceramic route is more cost and time effective than traditional ceramic processing.

EXAMPLES

Example 1—$Li_{1.3}Nb_{0.45}Al_{0.45}Ti_{1.1}(PO_4)_{2.85}(BO_4)_{0.15}$

Dry powders of lithium carbonate, niobium pentoxide, aluminum metaphosphate, titanium dioxide, and boric acid were mixed in a turbula mixer. The powder mix was poured into a Pt crucible and an aqueous solution of phosphoric acid was added to the dry mix and stirred to form a homogeneous slurry. The slurry was calcined overnight at 400° C. The crucible with the dried contents was then covered with a lid and placed into a furnace at 1500° C. for 3 h.

The resulting melt was poured onto a stainless steel table and roller quenched with a stainless steel roller. The sheet thickness was less than 1 mm, with ~90% of the melt remaining glassy. The glassy parts, which had a brown color, were broken into smaller pieces and collected.

The glass pieces (about 25×25 mm) were placed onto silica disks and loaded into a box furnace for crystallization. The thermal cycle for crystallization involved heating at a rate of 10° C./min to 900° C. (hold time 2 h) and cooling at a rate of 5° C./min. After crystallization the glass-ceramic pieces were white, opaque and dense.

Conductivity was measure by gold plating both sides of an 10 mm diameter disk. The conductivity of was $1.36 \times 10^{-4}$ S/cm.

Figure 2:
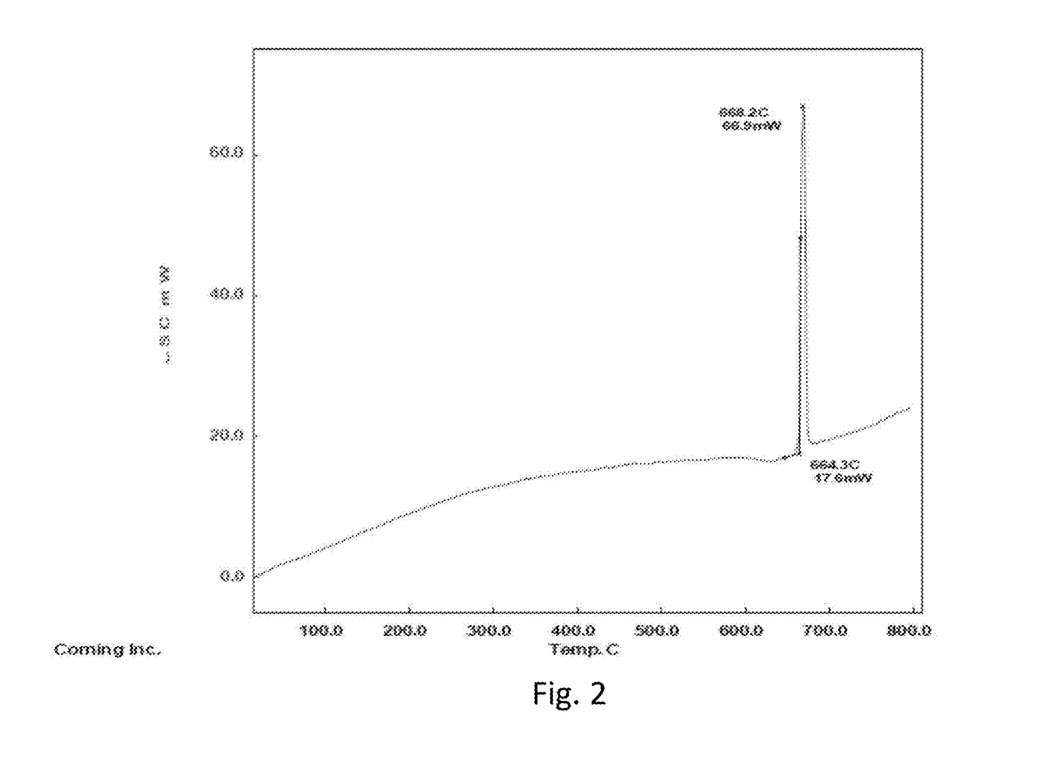
FIG. 2 is a DSC scan for a glass composition according to one embodiment.

A TGA scan, shown in FIG. 2, was performed in $N_2$ at 10° C./min in a Pt pan. The $Li_{1.3}Nb_{0.45}Al_{0.45}Ti_{1.1}(PO_4)_{2.85}(BO_4)_{0.15}$ material showed onset and peak crystallization temperatures of 664° C. and 668° C.

The x-ray analysis of the material reveals that 71% was a rhombohedral $Li(Al,Nb,Ti)_2((P,B)O_3)_4$ phase, 13% monoclinic $Li_3(Al,X,Ti)_2(PO_4)_3$, and 15% $LiTi(PO_4)O$.

Example 2—$Li_{1.3}Cr_{0.3}Ge_{0.6}Ti_{1.1}(PO_4)_3$

Dry powders of lithium carbonate, chromium(III) oxide, germanium dioxide and titanium dioxide were mixed in a turbula mixer. The powder mix was poured into a Pt crucible and an aqueous solution of phosphoric acid was added to the dry mix and stirred to form a homogeneous slurry. The slurry was calcined overnight at 400° C. The crucible with the dried contents was then covered with a lid and placed into a furnace at 1500° C. for 3 h.

The resulting melt was poured onto a stainless steel table and roller quenched with a stainless steel roller. The sheet thickness was less than 1 mm, with ~75% of the melt remaining glassy. The glassy parts, which had a dark green color, were broken into smaller pieces and collected.

The glass pieces (about 25×25 mm) were placed onto silica disks and loaded into a box furnace for crystallization. The thermal cycle for crystallization involved heating at a rate of 10° C./min to 900° C. (hold time 2 h) and cooling at a rate of 5° C./min. After crystallization the glass-ceramic pieces were grass green, opaque and dense.

Conductivity was measure by gold plating both sides of an 8 mm diameter disk. The conductivity of was $1.99 \times 10^{-5}$ S/cm.

Figure 3:
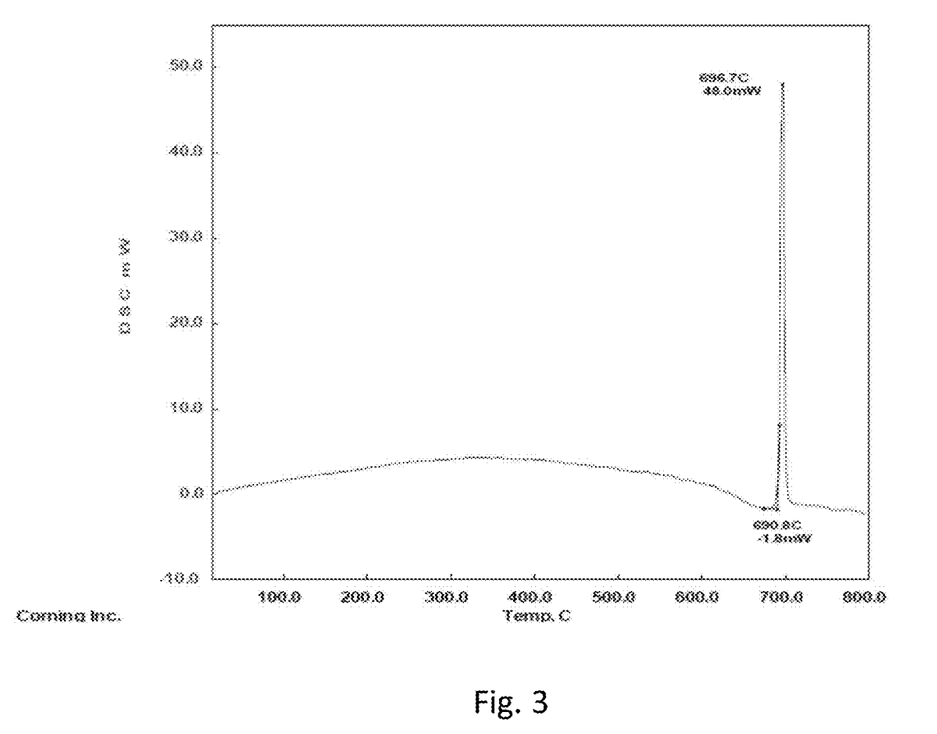
FIG. 3 is a DSC scan for a glass composition according to a further embodiment.

A TGA scan, shown in FIG. 3, was performed in $N_2$ at 10° C./min in a Pt pan. The $Li_{1.3}Cr_{0.3}Ge_{0.6}Ti_{1.1}(PO_4)_3$ material showed onset and peak crystallization temperatures of 691° C. and 697° C.

Figure 4:
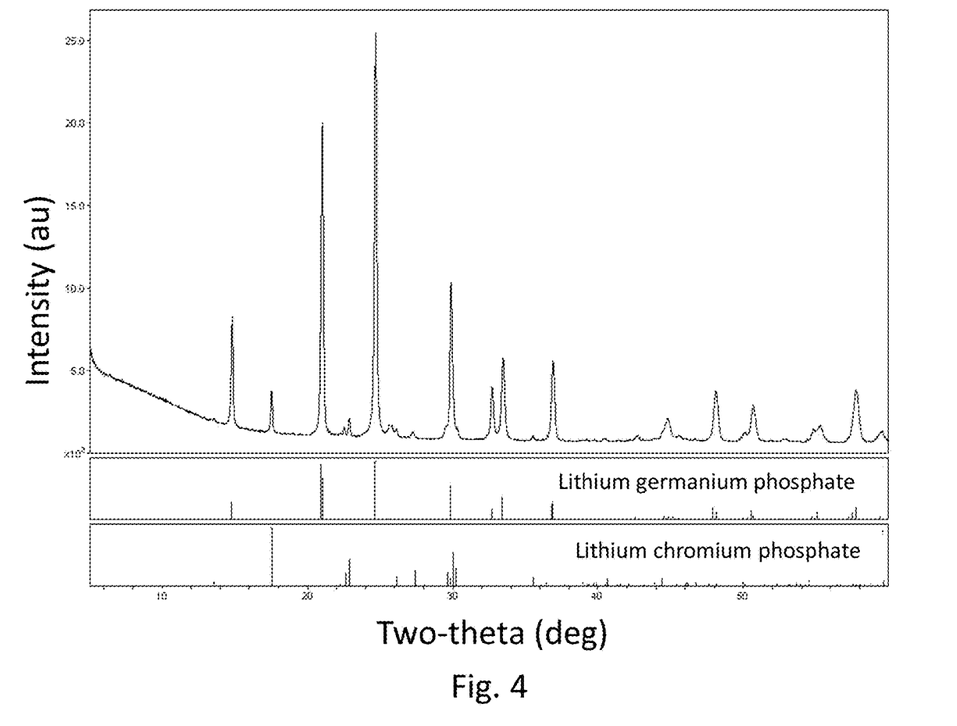
FIG. 4 is an XRD scan for a glass-ceramic according to one embodiment.

The x-ray diffraction data are shown in FIG. 4. The primary phase (90%) is a rhombohedral $Li(Cr,Ge,Ti)_2(PO_3)_4$ phase. The secondary phase (10%) was $LiCrP_2O_7$. In addition to the sample x-ray data, also shown in FIG. 4 are the index card data for lithium germanium phosphate and lithium chromium phosphate.

Figure 5:
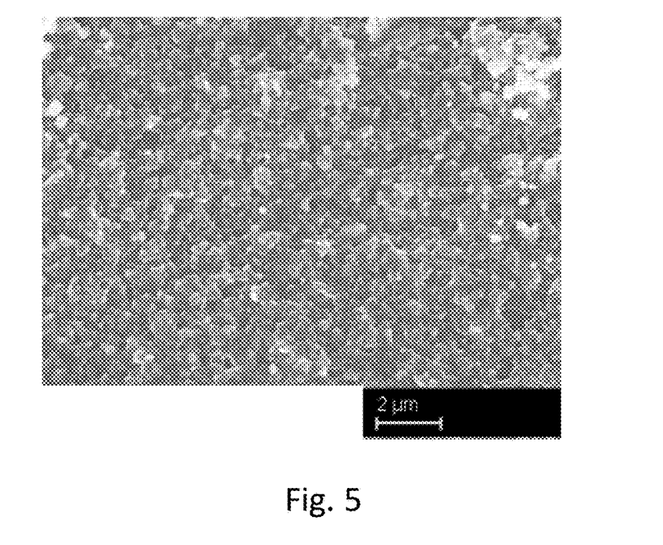
FIG. 5 is an SEM micrograph of the glass-ceramic of FIG. 4.

An SEM micrograph of a cross-sectional fracture surface is shown in FIG. 5. The data reveal a uniform fine microstructure for $Li_{1.3}Cr_{0.3}Ge_{0.6}Ti_{1.1}(PO_4)_3$ crystallized at 900° C. without a discrete nucleation step.

Example 3 and 4

$Li_{1.6}Cr_{0.6}Ge_{0.6}Ti_{0.8}(PO_4)_3$ and $Li_{1.6}Cr_{0.3}Ge_{0.6}Ti_{1.1}(PO_4)_{2.85}(BO_4)_{0.15}$ compositions were prepared in a manner consistent with the synthesis of Examples 1 and 2.

Example 5—$Li_{1.45}Cr_{0.45}Ge_{0.45}Ti_{1.1}(PO_4)_3$

Dry powders of lithium phosphate (monobasic), chromium(III) oxide, germanium dioxide and titanium dioxide were mixed in a turbula mixer. The powder mix was poured into a Pt crucible and an aqueous solution of phosphoric acid was added to the dry mix and stirred to form a homogeneous slurry. The slurry was calcined overnight at 400° C. The crucible with the calcined contents was then covered with a lid and placed into a furnace at 1500° C. for 3 h.

The resulting melt was poured onto a stainless steel table and roller quenched with a stainless steel roller. The sheet thickness was less than 1 mm, with ~80% of the melt remaining glassy. The glassy parts, which had a dark green color, were broken into smaller pieces and collected.

The glass pieces (about 25×25 mm) were placed onto silica disks and loaded into a box furnace for crystallization. The thermal cycle for crystallization involved heating at a rate of 10° C./min to 900° C. (hold time 2 h) and cooling at a rate of 5° C./min. After crystallization the glass-ceramic pieces were grass green, opaque and dense.

Conductivity was measure by gold plating both sides of an 8 mm diameter disk. The conductivity of was $2.41 \times 10^{-4}$ S/cm.

Figure 6:
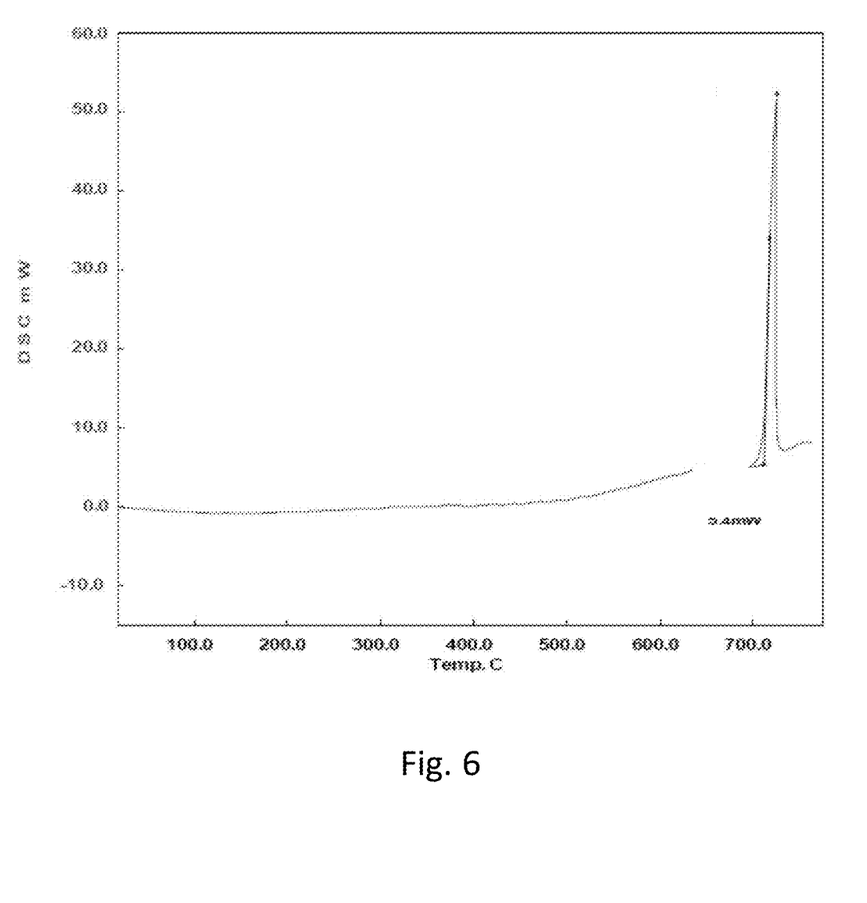
FIG. 6 is a DSC scan for a glass composition according to a further embodiment.

A TGA scan, shown in FIG. 6, was performed in $N_2$ at 10° C./min in a Pt pan. The $Li_{1.45}Cr_{0.45}Ge_{0.45}Ti_{1.1}(PO_4)_3$ material showed onset and peak crystallization temperatures of 712° C. and 726° C.

Figure 7:
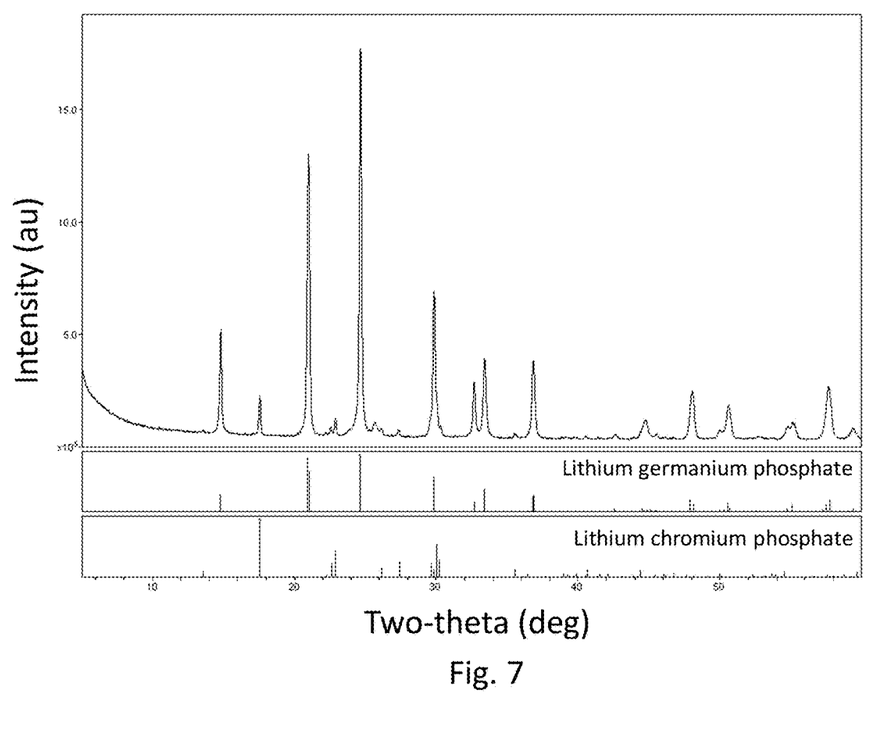
FIG. 7 is an XRD scan for a glass-ceramic according to one embodiment.

An X-ray diffraction trace is shown in FIG. 7. The primary (90%) glass-ceramic phase indexes to $Li_{1.45}Cr_{0.45}Ge_{0.45}Ti_{1.1}(PO_4)_3$. The secondary (10%) phase was $LiCrP_2O_7$.

Example 6—Stability Evaluation

Figure 8:
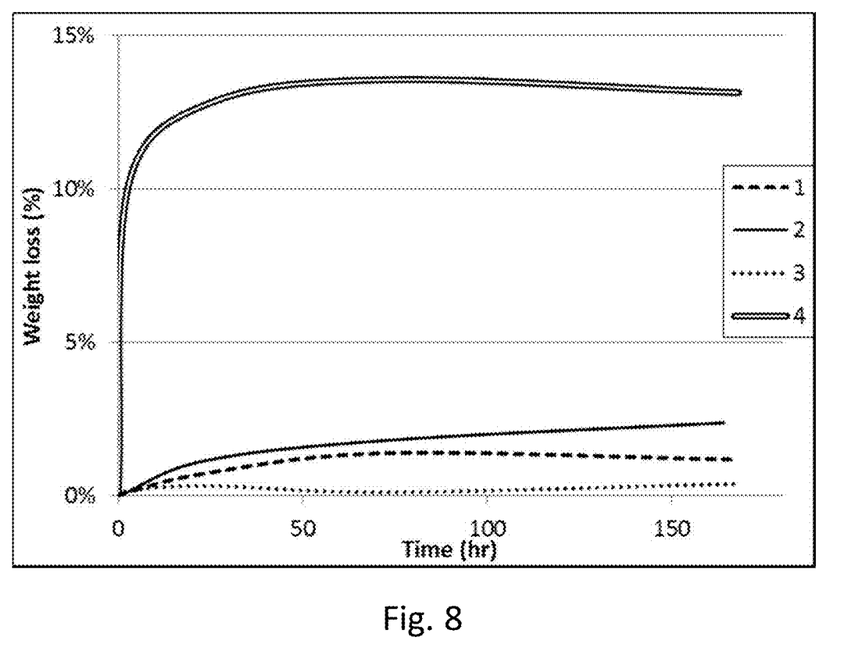
FIG. 8 is a plot of weight loss versus time for example glass-ceramic compositions when submerged in deionized water.

The water stability of Examples 1-4 was evaluated by measuring weight loss as a function of exposure (submersion) in de-ionized water at room temperature for up to 168 h (1 week). Weight loss as a function of time is shown in FIG. 8.

The compositions of Examples 1-3 ($Li_{1.3}Nb_{0.45}Al_{0.45}Ti_{1.1}(PO_4)_{2.85}(BO_4)_{0.15}$, $Li_{1.3}Cr_{0.3}Ge_{0.6}Ti_{1.1}(PO_4)_3$ and $Li_{1.6}Cr_{0.6}Ge_{0.6}Ti_{0.8}(PO_4)_3$) displayed good stability out to 168 h. The boron-free and chromium-containing Example 3 showed a maximum weight less of less than 1%, while the boron-containing and chromium-containing Example 4 ($Li_{1.6}Cr_{0.3}Ge_{0.6}Ti_{1.1}(PO_4)_{2.85}(BO_4)_{0.15}$) had a weight loss of greater than 12% at about 25 h. It will be appreciated that the inclusion of boron in the compositions does not per se increase the water solubity. Example 1 exhibited demonstrably good water stability as compared with Example 4, though both included equivalent amounts of $BO_4$.

The thermal history and select properties of exemplary compositions are given in Table 2. The glass formability of the compositions upon roller quenching is measured on a scale from 0 to 5, where a glass formability index of 0 corresponds to substantially no glass content (i.e., fully crystalline) following quenching and a glass formability index of 5 corresponds to a completely glassy or substantially completely glassy roller-quenched sheet.

A glass characterized by a glass formability index of 5 includes 85 to 100 vol. % glassy phase. A glass formability index of 4 corresponds to a roller quenched glass having from 65% up to 85 vol. % glassy phase. A glass formability index of 3 corresponds to a roller quenched sample having from 40% up to 65 vol. % glassy phase. A glass formability index of 2 corresponds to a roller quenched sample having from 15% up to 40 vol. % glassy phase. A glass formability index of 1 corresponds to a roller quenched sample having from 5% up to 15 vol. % glassy phase. A glass formability index of 0 corresponds to a roller quenched sample having less than 5 vol. % glassy phase.

The heat treatment data include both the nucleation temperature and time (T/t) and the crystallization temperature and time. The conductivity listed is that of the glass-ceramic formed using the reported heat treatment. The glass-ceramics disclosed herein may have a lithium ion conductivity of at least $1 \times 10^{-4}$ S/cm.

The glass transition temperature ($T_g$) and crystallization peak temperature ($T_x$) of the parent glass are also listed.

TABLE 2

Thermal history and properties of glass and glass-ceramic compositions.

| | | Heat treatment | | | | | |
|---|---|---|---|---|---|---|---|
| | Glass formability | nucleation T/t [° C.]/[h] | T [° C.] | t [h] | Conductivity [S/cm] | $T_g$ [° C.] | $T_x$ [° C.] |
| $Zn_{0.25}Li_{0.5}Fe_{0.7}Nb_{0.7}Ti_{0.6}(PO_4)_3$ | 4 | 525/1 | 800 | 2 | 1.0E−06 | | |
| $LiFe_{0.7}Nb_{0.7}Ti_{0.6}(PO_4)_3$ | 3 | 525/1 | 800 | 2 | 2.0E−07 | | |
| $Zn_{0.15}LiFe_{0.3}Nb_{0.3}Al_{0.3}Ti_{1.1}(PO_4)_3$ | 3 | 550 | 800 | 2 | 1.0E−07 | | 629 |
| $Zn_{0.25}Li_{0.8}Fe_{0.3}Nb_{0.3}Al_{0.3}Ti_{1.1}(PO_4)_3$ | 3 | 550 | 800 | 2 | 1.0E−07 | | 635 |
| $Li_{1.3}Nb_{0.3}Al_{0.6}Ti_{1.1}(PO_4)_3$ | 4 | | | | | | 658 |
| $Zn_{0.15}LiNb_{0.3}Al_{0.6}Ti_{1.1}(PO_4)_3$ | 5 | 550 | 800 | 2 | 3.2E−07 | | 663 |

TABLE 2-continued

Thermal history and properties of glass and glass-ceramic compositions.

| | Glass formability | Heat treatment nucleation T/t [° C.]/[h] | T [° C.] | t [h] | Conductivity [S/cm] | $T_g$ [° C.] | $T_x$ [° C.] |
|---|---|---|---|---|---|---|---|
| $Zn_{0.25}Li_{0.8}Nb_{0.3}Al_{0.6}Ti_{1.1}(PO_4)_3$ | 4 | 550 | 800 | 2 | 8.5E−07 | | 675 |
| $Zn_{0.4}LiAl_{0.8}Ti_{1.2}(PO_4)_3$ | 4 | 550 | 800 | 2 | 1.7E−06 | | 621 |
| $Zn_{0.3}LiCr_{0.3}Al_{0.3}Ti_{1.4}(PO_4)_3$ | 3 | 550 | 800 | 2 | 5.3E−07 | | 672 |
| $Zn_{0.3}Li_{1.3}Fe_{0.3}Al_{0.6}Ti_{1.1}(PO_4)_3$ | 3 | | 900 | 2 | 4.2E−06 | | 581 |
| $Li_{1.3}Cr_{0.3}Nb_{0.3}Al_{0.3}Ti_{1.1}(PO_4)_3$ | 3 | 678/1 | 900 | 6 | 2.2E−05 | | 714 |
| $LiNb_{0.45}Al_{0.45}Ti_{1.1}(PO_4)_3$ | 5 | 676/1 | 900 | 2 | 1.6E−05 | 623 | 721 |
| $Li_{0.95}Nb_{0.4}Al_{0.35}Ti_{1.25}(PO_4)_3$ | 3 | | 900 | 2 | 9.2E−07 | | 704 |
| $LiNb_{0.6}Al_{0.6}Ti_{0.8}(PO_4)_3$ | 4 | | 900 | 2 | 1.5E−05 | 616 | 697 |
| $Li_{1.6}Fe_{0.3}Nb_{0.3}Al_{0.6}Ti_{0.8}(PO_4)_3$ | 4 | 558/1 | 700 | 2 | 7.8E−07 | 533 | 592 |
| $Li_{1.3}V_{0.3}Al_{0.6}Ti_{1.1}(PO_4)_3$ | 3 | | 900 | 2 | 1.1E−05 | 564 | 626 |
| $Li_{0.7}V_{0.3}Nb_{0.3}Al_{0.3}Ti_{1.1}(PO_4)_3$ | 4 | 645/1 | 900 | 2 | 4.9E−07 | | 717 |
| $Li_{1.3}Nb_{0.45}Al_{0.45}Ti_{1.1}(PO_4)_{2.85}(BO_4)_{0.15}$ (example 1) | 4 | | 900 | 2 | 1.4E−04 | 597 | 668 |
| $Li_{1.6}Nb_{0.45}Al_{0.45}Ti_{1.1}(PO_4)_{2.7}(BO_4)_{0.3}$ | 5 | 611 | 900 | 2 | 6.9E−06 | 570 | 646 |
| $Li_{1.3}Cr_{0.3}Ge_{0.6}Ti_{1.1}(PO_4)_3$ (example 2) | 4 | | 900 | 2 | 4.8E−05 | 625 | 697 |
| $Li_{1.3}Cr_{0.3}Ge_{0.9}Ti_{0.8}(PO_4)_3$ | 5 | | 900 | 2 | 2.0E−05 | 605 | 701 |
| $Li_{1.4}Fe_{0.3}Nb_{0.3}Al_{0.4}Ti_{1.0}(PO_4)_3$ | 3 | 500/1 | 900 | 3 | 9.3E−07 | 567 | 614 |
| $Li_{1.4}Fe_{0.4}Nb_{0.4}Al_{0.4}Ti_{0.8}(PO_4)_3$ | 3 | 500/1 | 900 | 3 | 5.0E−07 | 537 | 607 |
| $Li_{1.6}Cr_{0.6}Ge_{0.6}Ti_{0.8}(PO_4)_3$ (example 3) | 4 | | 900 | 2 | 9.3E−05 | 653 | 733 |
| $Li_{1.6}Cr_{0.3}Ge_{0.6}Ti_{1.1}(PO_4)_{2.85}(BO_4)_{0.15}$ (example 4) | 4 | 500/1 | 900 | 2 | 2.8E−04 | 622 | 681 |
| $Li_{1.4}Cr_{0.4}Ge_{0.4}Ti_{1.2}(PO_4)_3$ | 3 | 500/1 | 900 | 2 | 1.3E−05 | 622 | 675 |
| $Li_{1.6}Cr_{0.3}Al_{0.3}Ge_{0.3}Ti_{1.1}(PO_4)_3$ | 4 | 500/1 | 900 | 2 | 8.5E−05 | 646 | 687 |
| $LiNb_{0.45}Al_{0.45}Ge_{0.2}Ti_{0.9}(PO_4)_3$ | 5 | | 900 | 2 | 1.4E−04 | 550 | 637 |
| $Li_{1.9}Cr_{0.6}Ge_{0.6}Ti_{0.8}(PO_4)_{2.85}(BO_4)_{0.15}$ | 3 | | 900 | 2 | 2.4E−05 | 613 | 705 |
| $Li_{1.6}Cr_{0.6}Si_{0.1}Ti_{1.3}(PO_4)_3$ | 3 | | 900 | 2 | 7.0E−06 | 651 | 742 |
| $Li_{1.9}Cr_{0.6}Si_{0.1}Ti_{1.3}(PO_4)_{2.85}(BO_4)_{0.15}$ | 3 | | 900 | 2 | 1.7E−04 | | 724 |
| $Li_{1.9}Cr_{0.3}Al_{0.3}Ge_{0.3}Ti_{1.1}(PO_4)_{2.85}(BO_4)_{0.15}$ | 3 | | 900 | 2 | 5.8E−05 | 573 | 664 |
| $Li_{1.8}Cr_{0.4}Al_{0.4}Ge_{0.3}Ti_{0.9}(PO_4)_3$ | 4 | | 900 | 2 | 2.7E−05 | 594 | 684 |
| $Li_{2.1}Cr_{0.4}Al_{0.4}Ge_{0.3}Ti_{0.9}(PO_4)_{2.85}(BO_4)_{0.15}$ | 4 | | 900 | 2 | 1.7E−06 | 577 | 665 |
| $Li_{1.6}Cr_{0.6}Ge_{0.3}Ti_{1.1}(PO_4)_3$ | 3 | | 900 | 2 | 1.0E−05 | 654 | 730 |
| $Li_{1.9}Cr_{0.6}Ge_{0.3}Ti_{1.1}(PO_4)_{2.85}(BO_4)_{0.15}$ | 3 | | 900 | 2 | 2.5E−10 | 620 | 695 |
| $Li_{1.3}Nb_{0.45}Al_{0.45}Ge_{0.2}Ti_{0.9}(PO_4)_{2.85}(BO_4)_{0.15}$ | 4 | | | | 5.19E−05 | 591 | 677 |
| $LiNb_{0.3}Al_{0.3}Ge_{0.2}Ti_{1.2}(PO_4)_3$ | 4 | | | | 1.09E−06 | 639 | 705 |
| $Li_{1.3}Fe_{0.3}Nb_{0.3}Al_{0.3}Ti_{1.1}(PO_4)_{2.85}(BO_4)_{0.15}$ | 3 | | | | 1.30E−05 | 569 | 631 |
| $Li_{1.6}Cr_{0.3}Si_{0.6}Ti_{1.1}(PO_4)_{2.85}(BO_4)_{0.15}$ | 5 | | | | 4.44E−06 | | 673 |
| $Li_{1.1}Cr_{0.1}Ge_{0.8}Ti_{1.1}(PO_4)_3$ | 3 | | | | 1.13E−05 | 629 | 699 |
| $Li_{1.2}Cr_{0.2}Ge_{0.7}Ti_{1.1}(PO_4)_3$ | 4 | | | | 2.98E−05 | 635 | 715 |
| $Li_{1.4}Cr_{0.4}Ge_{0.5}Ti_{1.1}(PO_4)_3$ | 4 | | | | 7.15E−05 | 633 | 718 |
| $Li_{1.5}Cr_{0.5}Ge_{0.4}Ti_{1.1}(PO_4)_3$ | 5 | | | | 3.12E−04 | 604 | 728 |
| $Li_{1.7}Cr_{0.7}Ge_{0.2}Ti_{1.1}(PO_4)_3$ | 3 | | | | 3.21E−05 | 670 | 739 |
| $Li_{1.7}Cr_{0.7}Ge_{0.7}Ti_{0.6}(PO_4)_3$ | 5 | | | | 6.05E−05 | 628 | 739 |
| $Li_{1.45}Cr_{0.45}Ge_{0.45}Ti_{1.1}(PO_4)_3$ (example 5) | 4 | | | | 2.41E−04 | 648 | 726 |
| $Li_{1.3}Cr_{0.3}Ge_{0.5}Ti_{1.2}(PO_4)_3$ | 3 | | | | 3.83E−05 | 652 | 716 |
| $Li_{1.6}Cr_{0.6}Ge_{0.4}Ti_{1.0}(PO_4)_3$ | 3 | | | | 8.20E−06 | 642 | 725 |
| $Li_{1.7}Cr_{0.7}Ge_{0.4}Ti_{0.9}(PO_4)_3$ | 3 | | | | 3.08E−06 | 657 | 734 |
| $Li_{1.8}Cr_{0.8}Ge_{0.4}Ti_{0.8}(PO_4)_3$ | 3 | | | | 1.83E−06 | 652 | 741 |
| $Li_{1.5}Cr_{0.5}Ge_{0.3}Ti_{1.2}(PO_4)_3$ | 3 | | | | 5.83E−06 | 645 | 719 |
| $Li_{1.5}Cr_{0.5}Ge_{0.5}Ti_{1.0}(PO_4)_3$ | 4 | | | | 1.47E−04 | 643 | 721 |
| $Li_{1.5}Cr_{0.5}Ge_{0.7}Ti_{0.8}(PO_4)_3$ | 4 | | | | 1.45E−04 | 636 | 720 |
| $Li_{1.5}Cr_{0.5}Ge_{0.8}Ti_{0.7}(PO_4)_3$ | 3 | | | | 1.06E−04 | 645 | 724 |
| $Li_{1.55}Cr_{0.55}Ge_{0.35}Ti_{1.1}(PO_4)_3$ | 3 | | | | 1.55E−04 | 633 | 720 |

Crystallographic data for the glass-ceramic materials are summarized in Table 3.

TABLE 3

Crystallographic properties of glass-ceramic compositions

| | rhombohedral phase [%] | a [nm] | c [nm] |
|---|---|---|---|
| $Zn_{0.25}Li_{0.5}Fe_{0.7}Nb_{0.7}Ti_{0.6}(PO_4)_3$ | | | |
| $LiFe_{0.7}Nb_{0.7}Ti_{0.6}(PO_4)_3$ | | | |
| $Zn_{0.15}LiFe_{0.3}Nb_{0.3}Al_{0.3}Ti_{1.1}(PO_4)_3$ | 99 | 8.5189 | 20.991 |
| $Zn_{0.25}Li_{0.8}Fe_{0.3}Nb_{0.3}Al_{0.3}Ti_{1.1}(PO_4)_3$ | 92 | 8.5289 | 21.061 |
| $Li_{1.3}Nb_{0.3}Al_{0.6}Ti_{1.1}(PO_4)_3$ | 99 | 8.4929 | 20.8941 |
| $Zn_{0.15}LiNb_{0.3}Al_{0.6}Ti_{1.1}(PO_4)_3$ | 86 | 8.5145 | 20.9407 |
| $Zn_{0.25}Li_{0.8}Nb_{0.3}Al_{0.6}Ti_{1.1}(PO_4)_3$ | 82 | 8.5235 | 21.005 |

TABLE 3-continued

Crystallographic properties of glass-ceramic compositions

| | rhombohedral phase [%] | a [nm] | c [nm] |
|---|---|---|---|
| $Zn_{0.4}LiAl_{0.8}Ti_{1.2}(PO_4)_3$ | 69 | 8.4819 | 20.834 |
| $Zn_{0.3}LiCr_{0.3}Al_{0.3}Ti_{1.4}(PO_4)_3$ | | 8.5018 | 20.8811 |
| $Zn_{0.3}Li_{1.3}Fe_{0.3}Al_{0.6}Ti_{1.1}(PO_4)_3$ | 71 | 8.5024 | 20.931 |
| $Li_{1.3}Cr_{0.3}Nb_{0.3}Al_{0.3}Ti_{1.1}(PO_4)_3$ | 82 | 8.5162 | 20.9521 |
| $LiNb_{0.45}Al_{0.45}Ti_{1.1}(PO_4)_3$ | 88 | 8.5017 | 20.9558 |
| $Li_{0.95}Nb_{0.4}Al_{0.35}Ti_{1.25}(PO_4)_3$ | 53 | 8.503 | 21.023 |
| $LiNb_{0.6}Al_{0.6}Ti_{0.8}(PO_4)_3$ | 98 | 8.5087 | 21.032 |
| $Li_{1.6}Fe_{0.3}Nb_{0.3}Al_{0.6}Ti_{0.8}(PO_4)_3$ | 59 | 8.5082 | 20.999 |
| $Li_{1.3}V_{0.3}Al_{0.6}Ti_{1.1}(PO_4)_3$ | 78 | 8.4599 | 20.786 |
| $Li_{0.7}V_{0.3}Nb_{0.3}Al_{0.3}Ti_{1.1}(PO_4)_3$ | 76 | 8.5213 | 21.086 |
| $Li_{1.3}Nb_{0.45}Al_{0.45}Ti_{1.1}(PO_4)_{2.85}(BO_4)_{0.15}$ (example 1) | 71 | 8.4964 | 20.9045 |
| $Li_{1.6}Nb_{0.45}Al_{0.45}Ti_{1.1}(PO_4)_{2.7}(BO_4)_{0.3}$ | 37 | 8.4935 | 20.587 |
| $Li_{1.3}Cr_{0.3}Ge_{0.6}Ti_{1.1}(PO_4)_3$ (example 2) | 91 | 8.4338 | 20.7689 |
| $Li_{1.3}Cr_{0.3}Ge_{0.9}Ti_{0.8}(PO_4)_3$ | 88 | 8.3909 | 20.7361 |
| $Li_{1.4}Fe_{0.3}Nb_{0.3}Al_{0.4}Ti_{1.0}((PO_4)_3$ | 72 | 8.52125 | 20.9194 |
| $Li_{1.4}Fe_{0.4}Nb_{0.4}Al_{0.4}Ti_{0.8}(PO_4)_3$ | 73 | 8.5327 | 20.9841 |
| $Li_{1.6}Cr_{0.6}Ge_{0.6}Ti_{0.8}(PO_4)_3$ (example 3) | 74 | 8.4372 | 20.865 |
| $Li_{1.6}Cr_{0.3}Ge_{0.6}Ti_{1.1}(PO_4)_{2.85}(BO_4)_{0.15}$ (example 4) | 78 | 8.46712 | 20.8045 |
| $Li_{1.4}Cr_{0.4}Ge_{0.4}Ti_{1.2}(PO_4)_3$ | 83 | 8.468 | 20.857 |
| $Li_{1.6}Cr_{0.3}Al_{0.3}Ge_{0.3}Ti_{1.1}(PO_4)_3$ | 79 | 8.4559 | 20.7978 |
| $LiNb_{0.45}Al_{0.45}Ge_{0.2}Ti_{0.9}(PO_4)_3$ | 84 | 8.39563 | 20.6508 |
| $Li_{1.9}Cr_{0.6}Ge_{0.6}Ti_{0.8}(PO_4)_{2.85}(BO_4)_{0.15}$ | 76 | 8.3727 | 21.4079 |
| $Li_{1.6}Cr_{0.6}Si_{0.1}Ti_{1.3}(PO_4)_3$ | 57 | 8.485 | 21.189 |
| $Li_{1.9}Cr_{0.6}Si_{0.1}Ti_{1.3}(PO_4)_{2.85}(BO_4)_{0.15}$ | 98 | 8.486 | 21.341 |
| $Li_{1.9}Cr_{0.3}Al_{0.3}Ge_{0.3}Ti_{1.1}(PO_4)_{2.85}(BO_4)_{0.15}$ | 81 | | |
| $Li_{1.8}Cr_{0.4}Al_{0.4}Ge_{0.3}Ti_{0.9}(PO_4)_3$ | 79 | 8.397 | 21.326 |
| $Li_{2.1}Cr_{0.4}Al_{0.4}Ge_{0.3}Ti_{0.9}(PO_4)_{2.85}(BO_4)_{0.15}$ | 77 | 8.383 | 21.602 |
| $Li_{1.6}Cr_{0.6}Ge_{0.3}Ti_{1.1}(PO_4)_3$ | 70 | 8.464 | 21.257 |
| $Li_{1.9}Cr_{0.6}Ge_{0.3}Ti_{1.1}(PO_4)_{2.85}(BO_4)_{0.15}$ | 82 | 8.456 | 21.364 |
| $Li_{1.3}Nb_{0.45}Al_{0.45}Ge_{0.2}Ti_{0.9}(PO_4)_{2.85}(BO_4)_{0.15}$ | 98.4 | 8.49 | 20.97 |
| $LiNb_{0.3}Al_{0.3}Ge_{0.2}Ti_{1.2}(PO_4)_3$ | 100 | 8.4809 | 20.9277 |
| $Li_{1.3}Fe_{0.3}Nb_{0.3}Al_{0.3}Ti_{1.1}(PO_4)_{2.85}(BO_4)_{0.15}$ | 100 | 8.52607 | 20.9291 |
| $Li_{1.6}Cr_{0.3}Si_{0.6}Ti_{1.1}(PO_4)_{2.85}(BO_4)_{0.15}$ | 100 | 8.50379 | 20.9351 |
| $Li_{1.1}Cr_{0.1}Ge_{0.8}Ti_{1.1}(PO_4)_3$ | 96 | 8.40972 | 20.7612 |
| $Li_{1.2}Cr_{0.2}Ge_{0.7}Ti_{1.1}(PO_4)_3$ | 92 | 8.41757 | 20.7879 |
| $Li_{1.4}Cr_{0.4}Ge_{0.5}Ti_{1.1}(PO_4)_3$ | 89 | 8.44437 | 20.8261 |
| $Li_{1.5}Cr_{0.5}Ge_{0.4}Ti_{1.1}(PO_4)_3$ | 88 | 8.4569 | 20.8598 |
| $Li_{1.7}Cr_{0.7}Ge_{0.2}Ti_{1.1}(PO_4)_3$ | | | |
| $Li_{1.7}Cr_{0.7}Ge_{0.7}Ti_{0.6}(PO_4)_3$ | | | |
| $Li_{1.45}Cr_{0.45}Ge_{0.45}Ti_{1.1}(PO_4)_3$ (example 5) | 90 | 8.4501 | 20.8343 |
| $Li_{1.3}Cr_{0.3}Ge_{0.5}Ti_{1.2}(PO_4)_3$ | 90 | 8.4434 | 20.8073 |
| $Li_{1.6}Cr_{0.6}Ge_{0.4}Ti_{1.0}(PO_4)_3$ | 88 | 8.457 | 20.860 |
| $Li_{1.7}Cr_{0.7}Ge_{0.4}Ti_{0.9}(PO_4)_3$ | 87 | 8.454 | 20.850 |
| $Li_{1.8}Cr_{0.8}Ge_{0.4}Ti_{0.8}(PO_4)_3$ | 85 | 8.453 | 20.825 |
| $Li_{1.5}Cr_{0.5}Ge_{0.3}Ti_{1.2}(PO_4)_3$ | 91 | 8.472 | 20.875 |
| $Li_{1.5}Cr_{0.5}Ge_{0.5}Ti_{1.0}(PO_4)_3$ | 90 | 8.441 | 20.845 |
| $Li_{1.5}Cr_{0.5}Ge_{0.7}Ti_{0.8}(PO_4)_3$ | 89 | 8.414 | 20.799 |
| $Li_{1.5}Cr_{0.5}Ge_{0.8}Ti_{0.7}(PO_4)_3$ | 91 | 8.461 | 20.879 |
| $Li_{1.55}Cr_{0.55}Ge_{0.35}Ti_{1.1}(PO_4)_3$ | 89 | 8.397 | 20.785 |

Embodiments relate to a glass-ceramic solid electrolyte. The glass-ceramic may have a lithium ion conductivity of at least $1 \times 10^{-4}$ S/cm. The solid electrolyte may be incorporated into an energy storage device such as a fuel cell or a lithium-ion battery.

As used herein, the singular forms "a," "an" and "the" include plural referents unless the context clearly dictates otherwise. Thus, for example, reference to a "glass" includes examples having two or more such "glasses" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a glass or glass-ceramic composition that comprises particular constituents include embodiments where the composition consists of the constituents and embodiments where the composition consists essentially of the constituents.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A glass-ceramic having a composition comprising, in mole percent:
   5-28% $Li_2O$, 14-37% $TiO_2$, and 32-48% $P_2O_5$, and further comprising at least one relationship (i)-(iii), wherein
   (i) the composition comprises at least two oxides selected from the group consisting of >0-13% $Al_2O_3$, >0-13% $Fe_2O_3$ and >0-13% $Nb_2O_5$;
   (ii) the composition comprises at least two oxides selected from the group consisting of >0-10% $Cr_2O_3$, >0-5% $SiO_2$ and >0-25% $GeO_2$; and
   (iii) the composition comprises at least three oxides selected from the group consisting of >0-13% $Al_2O_3$, >0-13% $Fe_2O_3$; >0-13% $Nb_2O_5$, >0-10% $Cr_2O_3$, >0-5% $SiO_2$ and >0-25% $GeO_2$; and
   wherein the glass-ceramic comprises at least 70 vol % of a NZP crystalline phase and a lithium ion conductivity of at least $1 \times 10^{-4}$ S/cm.

2. The glass-ceramic according to claim 1, comprising 4-10% $Al_2O_3$ and 4-10% $Nb_2O_5$.

3. The glass-ceramic according to claim 1, further comprising 1-4% $B_2O_3$.

4. The glass-ceramic according to claim 1, comprising 4-10% $Al_2O_3$, 4-10% $Nb_2O_5$ and 1-4% $B_2O_3$.

5. The glass-ceramic according to claim 1, comprising 1-8% $Cr_2O_3$ and 4-20% $GeO_2$.

6. The glass-ceramic according to claim 1, further comprising at least one oxide selected from the group consisting of >0-17% $Na_2O$ and >0-17% ZnO.

7. A glass-ceramic article having a NZP crystalline phase characterized by the formula $M_yA_2(XO_4)_3$, ($0.1 \leq y \leq 2.2$) where M represents one or more monovalent or divalent cations selected from the group consisting of Li, Na and Zn, A represents one or more trivalent, tetravalent or pentavalent cations selected from the group consisting of Al, Cr, Fe, Ga, Si, Ti, Ge, V and Nb, and X represents P cations which may be partially substituted by B cations, and further comprising at least one relationship (i)-(iii), wherein
   (i) A represents two or more cations selected from the group consisting of Al, Fe and Nb; and
   (ii) A represents two or more cations selected from the group consisting of Cr, Si and Ge; and
   (iii) A represents three or more cations selected from the group consisting of Al, Fe, Nb, Cr, Si and Ge; and
   wherein the glass-ceramic article comprises at least 70 vol % of the NZP crystalline phase and a lithium ion conductivity of at least $1 \times 10^{-4}$ S/cm.

8. The glass-ceramic article according to claim 7, wherein M represents Li and Zn.

9. The glass-ceramic article according to claim 7, wherein A represents Al, Ti and Nb.

10. The glass-ceramic article according to claim 7, wherein A represents Cr, Ti and Ge.

11. The glass-ceramic article according to claim 7, wherein A represents three or more cations selected from the group consisting of Al, Cr, Fe, Ga, Si, Ti, Ge, V and Nb.

12. The glass-ceramic article according to claim 7, wherein X represents P and B.

13. The glass-ceramic article according to claim 7, comprising 4-10 mol. % $Al_2O_3$ and 4-10 mol. % $Nb_2O_5$.

14. The glass-ceramic article according to claim 7, comprising 1-4 mol. % $B_2O_3$.

15. The glass-ceramic article according to claim 7, comprising 4-10 mol. % $Al_2O_3$, 4-10 mol. % $Nb_2O_5$ and 1-4 mol. % $B_2O_3$.

16. The glass-ceramic article according to claim 7, comprising 1-8 mol. % $Cr_2O_3$ and 4-20 mol. % $GeO_2$.

17. The glass-ceramic article according to claim 7, wherein the glass-ceramic article comprises less than 1 vol % of glassy phase.

18. The glass-ceramic article according to claim 7, wherein the article has a thickness of less than 2 mm.

19. The glass-ceramic article according to claim 7, wherein M is Li and $1.2 \leq y \leq 2.2$.

20. A glass-ceramic comprising at least 70 vol % of a NZP crystalline phase and having a composition comprising, in mole percent:
   5-28% $Li_2O$, 14-37% $TiO_2$, 32-48% $P_2O_5$, and at least one oxide selected from the group consisting of >0-17% $Na_2O$ and >0-17% ZnO, and further comprising at least one relationship (i)-(iv), wherein
   (i) the composition comprises at least two oxides selected from the group consisting of >0-13% $Al_2O_3$, >0-13% $Fe_2O_3$ and >0-13% $Nb_2O_5$;
   (ii) the composition comprises at least two oxides selected from the group consisting of >0-10% $Cr_2O_3$, >0-5% $SiO_2$ and >0-25% $GeO_2$;
   (iii) the composition comprises at least three oxides selected from the group consisting of >0-13% $Al_2O_3$, >0-13% $Fe_2O_3$; >0-13% $Nb_2O_5$, >0-10% $Cr_2O_3$ and >0-25% $GeO_2$; and
   (iv) the composition comprises at least three oxides selected from the group consisting of >0-13% $Fe_2O_3$; >0-13% $Nb_2O_5$, >0-10% $Cr_2O_3$, >0-5% $SiO_2$ and >0-25% $GeO_2$.

21. The glass-ceramic according to claim 20, wherein the glass-ceramic comprises less than 5 vol % of glassy phase.

* * * * *

UNITED STATES PATENT AND TRADEMARK OFFICE
CERTIFICATE OF CORRECTION

PATENT NO. : 10,173,921 B2  
APPLICATION NO. : 14/469803  
DATED : January 8, 2019  
INVENTOR(S) : Bruce Gardiner Aitken et al.

Page 1 of 1

It is certified that error appears in the above-identified patent and that said Letters Patent is hereby corrected as shown below:

On the Title Page

On page 2, Column 2, item [56], Line 16, delete "Supertonic" and insert -- Superionic --, therefor.

In the Claims

Column 15, Line 33, Claim 1, after "and" delete "further comprising".

Column 16, Line 1, Claim 7, delete "V" and insert -- V, --, therefor.

Column 16, Line 2, Claim 7, after "and" delete "further comprising".

Column 16, Line 42, Claim 20, after "having" delete "a composition comprising,".

Column 16, Line 46, Claim 20, after "and" delete "further comprising".

Signed and Sealed this  
Tenth Day of December, 2019

Andrei Iancu  
*Director of the United States Patent and Trademark Office*